Figure 1:
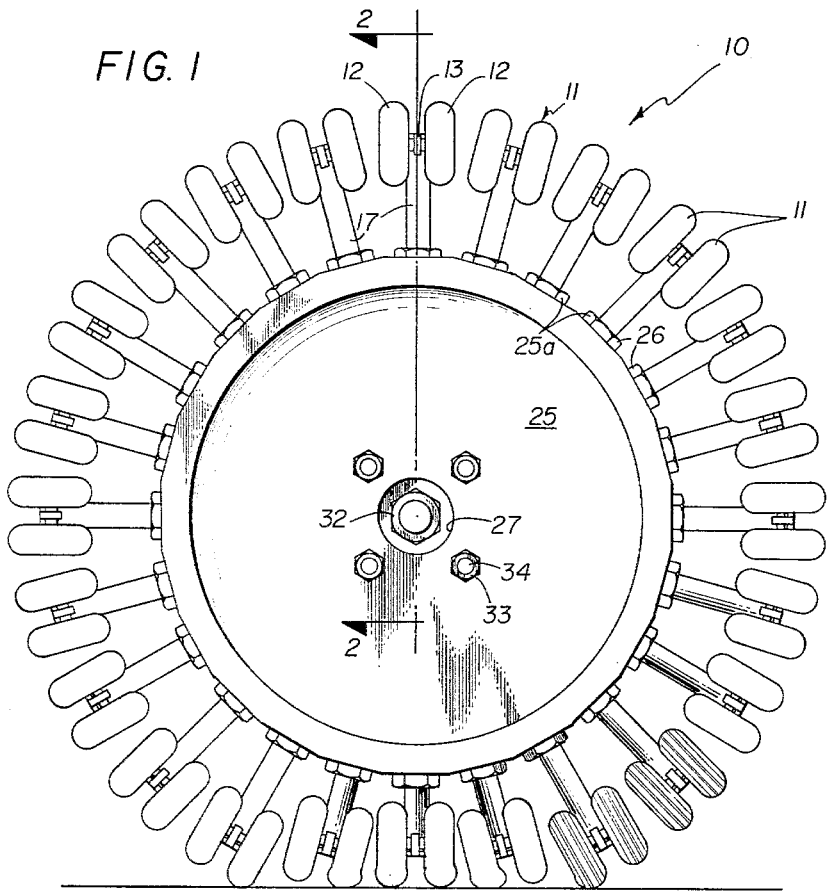

May 31, 1966 W. W. DALRYMPLE 3,253,632
RESILIENT WHEEL

Filed April 25, 1963 2 Sheets-Sheet 1

FIG. I

INVENTOR.
WAYNE W. DALRYMPLE
BY Ronald W. Mayes
ATTORNEY

United States Patent Office 3,253,632
Patented May 31, 1966

3,253,632
RESILIENT WHEEL
Wayne W. Dalrymple, Wichita, Kans., assignor to The Boeing Company, Wichita, Kans., a corporation of Delaware
Filed Apr. 25, 1963, Ser. No. 275,543
5 Claims. (Cl. 152—15)

This invention relates to a wheel for a vehicle. More particularly this invention relates to a resilient vehicle wheel.

An object of this invention is the provision of a novel resilient wheel capable of providing good traction and curb climbing capabilities, low ground pressure, better ability to conform to local terrain or road irregularities, and/or having lower unsprung weight.

Another object of this invention is the provision of a novel resilient wheel that is of simple design, low weight, economical to manufacture, easy to repair, and/or has components that are easily replaced.

Another object of this invention is the provision of a novel resilient wheel having a plurality of rotatable tires transversely mounted on the periphery of the wheel in such a manner as to provide extremely good traction, curb climbing, and turning characteristics particularly where turning is accomplished by means of differential speeds of oppositely disposed wheels.

Another object of this invention is the provision of a novel resilient vehicle wheel comprising a multiplicity of bogies each carrying a plurality of small bogie wheels, the bogies being resiliently mounted on radially extending, resiliently supported shafts so that there is increased traction due to the tendency of the vehicle wheel to flatten on the terrain engaging portion thereof.

Figure 2:
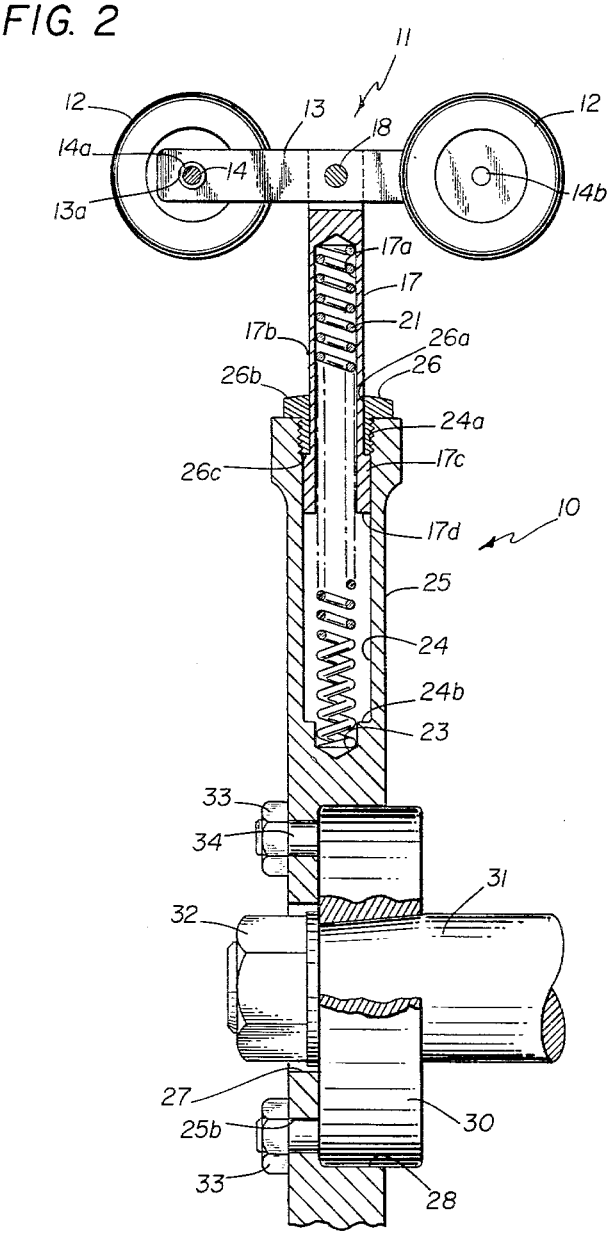

The invention further resides in certain novel features of construction, combinations, and arrangements of parts, and further objects and advantages of the invention will be apparent to those skilled in the art to which it pertains from the following description of the present preferred embodiment thereof described with reference to the accompanying drawings, which form a part of this specification, wherein the same reference numerals indicate corresponding parts throughout the several views, and in which:

FIG. 1 is a side elevational view of a resilient vehicle wheel embodying the invention; and FIG. 2 is a sectional view along line 2—2 of FIG. 1.

It is to be understood that the invention is not limited to the details of construction and the arrangements of parts shown in the drawings and hereafter described in detail, but is capable of being otherwise embodied and of being practiced and carried out in various ways. It is to be further understood that the terminology employed herein is for the purpose of description and there is no intention to herein limit the invention beyond the requirements of the prior art.

Referring to FIG. 1, a resilient wheel is indicated generally by reference numeral 10. The wheel 10 comprises a plurality of resiliently mounted bogies, indicated generally by the reference numeral 11. There are preferably twenty-four equiangularly spaced bogies 11.

Each of the bogies 11 comprises four resilient, non-metallic tires 12 mounted upon a transversely extending support 13 by means of a pair of laterally spaced axles 14 on opposite ends 14b thereof. Each of the axles 14 comprises an embossed central cylindrical portion 14a fixed in a drill hole 13a in a lateral end of the transverse support 13. The opposite ends 14b of the axle 14 are of reduced diameter so as to permit the spoke track tires 12 to be journaled thereon. Preferably, cotter pins are inserted in holes drilled in the opposite ends of the axle 14 for retaining the tires 12 on the axle 14. The axle 14 may be fixed in an end of the transverse support 13 by any suitable means such as by press fitting and/or welding.

As pointed out hereinabove, each of the bogies 11 has four tires 12 mounted in pairs on two axles 14 carried at opposite ends of the spoke track wheel support member 13, FIGS. 1 and 2. The transverse support member 13 is freely pivotally connected at its center to an outer radial end of a track wheel spoke or piston 17 by means of a journal bolt and nut assembly 18. The piston 17 is bifurcated at its outer end and the transverse member 13 is fastened therein.

Each piston 17 is resiliently mounted and urged radially outwardly by a coiled compression spring 21. An outer radial end of the spring 21 is disposed within a cylindrical bore 17a extending substantially the length of the piston 17. The lower inner end of the spring 21 is seated against a bottom of a drill hole 23. The hole 23 has been counterbored, thus forming a counterbore 24 in the wheel disk 25. The outer end 24a of the bore 24 is internally threaded for receiving an externally threaded bearing nut 26. The nut 26 is preferably of bronze or other bearing material. The nut 26 has a smooth central bore for providing a guide bearing that slidably receives and guides the piston 17. The outer cylindrical surface 17b of the piston is smooth for minimum sliding friction with the bearing surface 26a of the bearing nut 26. The nut 26 preferably has a hexagonal wrenching head 25a for permitting the nut 26 to be threaded into and tightly secured in the end 24a of the bore 24.

The piston 17 carrying the bogie wheels 12 is prevented from leaving the bore 24 by an enlarged cylindrical head at the inner end thereof having an annular radial shoulder 17c adapted to be stopped against an inner end 26c of the nut 26. When the piston 17 has its head bottomed in the bore 24, the end 17d of the piston is stopped against an annular shoulder 24b formed by the counterbore 24.

Any air trapped within the piston 17 and the bore 24 of the wheel 10 acts as a pneumatic cushion and assists the spring 21 in its function of resisting the inward movement of the piston 17. The amount of pneumatic resistance or support provided by this air cushion depends upon the air escape passage size or rate of air transgression permitted past the wall 17b of the piston and the nut bearing surface 26a. Preferably the clearance between the piston 17 and the nut 26 is 0.001 to 0.003 inch. However it is to be understood that this tolerance can be altered as desired and that valves or vents can be provided as desired in a manner well known in the art. Moreover, if desired, air passage means can be provided interconnecting the bores 24 for forming pressure equalization means. The chief advantage of this feature resides in further assurance of a softer and therefore smoother riding resilient wheel. However, this advantage is offset by an increase in travel or radial displacement of each piston 17 and an inability to withstand high shock loads over rough terrain.

The wheel disk 25 is not perfectly round since it has twenty-four flat surfaces 25a at the periphery thereof for permitting the head 26b of the bearing nut 26 to frictionally engage as much peripheral wheel area as possible for good seating and better assurance against casual loosening of the nut 26.

The wheel disk 24 has a transversely or laterally enlarged, annular, peripheral scuff flange or bead for increased strength and ruggedness. The wheel disk 25 has a central cylindrical opening 27 and a cylindrical counterbore 28 for being carried on a wheel hub 30. The hub 30 is mounted on a tapered wheel spindle 31 on the end of a torsion box and held in place by a spindle nut 32. The hub 30 has four threaded wheel studs 34 equally spaced on a bolt circle and protruding through four corresponding openings 25b formed in the wheel disk 25. Four stud nuts 33 are threaded onto the studs 34 for retaining the wheel disk 25 on the hub 30.

The bogies 11 are broad and laterally extend beyond the scuff flange of the wheel 25 for providing a wide track resilient wheel. The tires 12 may be made entirely of rubber or of a synthetic material such as an elastomer. The tires 12 are stronger and will wear longer if they have metal hubs with nonmetallic rims for better bearing and rigidity characteristics.

It has been found that the bogies 11 provide the wheel 10 with good steering characteristics because the bogies 11 are self-aligning according to the reactive forces applied to the tires 12 on the opposite ends of the bogies 11. For example, when the wheel 10 is rolling along a straight line, the bogie supports 13 are parallel and disposed perpendicularly to the line of travel. The axles 14 are parallel to the line of travel. Similarly, when the wheel 10 is traveling along an arcuate path, as in a turn, the supports 13 are aligned with the radius of the arcuate path, and the axles 14 are tangential to the arcuate path. The resilient wheel 10 therefore, has consistently good traction in both the straightaway and in turns.

Skid steering of the wheel 10 is very effective because very little increase or reduction in power to one of oppositely disposed wheels is needed. The bogies 11, as a precautionary measure, are spaced close enough together to prevent their being turned through ninety degrees or otherwise greatly misaligned while not in contact with the terrain.

An advantage of this invention is that in addition to the resilient wheel 10 flattening on the terrain contacting portion thereof and readily conforming to terrain surface irregularities, each of the bogies 11 contacts the ground at four points of relatively small area. On hard surfaces, this feature provides advantageously low resistance and friction. However, in soft terrain the wheels or tires 12 of the bogies 11 dig in and serve very effectively as grousers or cleats. The greater the amount the tires 12 sink or dig into the terrain, the greater the tractive effort. In swampy terrain or water, the bogies 11 serve as paddles much in the fashion of a steamboat sidewheel paddles. Obviously, the curb climbing capability of the wheel 10 is excellent.

The tires 12 are self cleaning because they are rotatable on their axles 14 and are free to rotate. The tires 12 of each pair are spaced far enough apart on an end of an axle 14 for good self cleaning action.

Due to the provision of individual suspension or shock absorbers for the pistons 17, the total unsprung weight of the wheel 10 is substantially less than for wheels having conventional tires. The unsprung weight comprises the bogies 11 and the pistons 17 and does not include usual hub and spindle assemblies as in ordinary vehicle wheels. The independently suspended pistons 17 and bogies 11 damp vibrations locally that are usually transmitted via ordinary vehicle tires, wheels, hubs, and spindles to a conventional vehicle tires, wheels, hubs, and spindles to a conventional vehicle suspension system. Those vibrations not damped are then transmitted to the body of the vehicles.

It will be understood that this invention can be modified to adapt it to various circumstances and conditions, and it is accordingly desired to comprehend within the purview of this invention such modifications as may be considered to fall within the scope of the appended claims.

What is claimed is:
1. A resilient wheel comprising,
 a wheel hub having a plurality of coplanar radially elongated cylinders formed therein and having a mouth at the periphery thereof,
 a cylindrical spoke having an enlarged piston head on one end thereof slidably disposed in each of said cylinders and having a coaxial cylindrical opening formed in said piston head and throughout a major portion of the length of said spoke,
 a bearing nut disposed over each said spoke and threaded into the mouth of said cylinder for retaining said spoke piston head in said cylinder, said piston head being adapted to stop against the inner end of said bearing nut and stop on the bottom of said cylinder,
 a compression spring disposed in each said cylinders and said bores, each said spring having an inner end seated against said hub at the bottom of said cylinder and having an outer end bearing against said spoke urging said spoke radially outwardly,
 a transversely disposed member pivotally connected to the outer end of each said spoke,
 an axle extending through and fixed to each end of each of said transverse members, and
 a wheel rotatably mounted on each outer end of each of said axles.
2. A resilient wheel comprising,
 a wheel hub having a plurality of coplanar radially elongated cylinders formed therein and having a mouth at the periphery thereof,
 a cylindrical spoke having an enlarged piston head on one end thereof slidably disposed in each of said cylinders and having a coaxial cylindrical opening formed in said piston head and throughout a major portion of the length of said spoke,
 a nut disposed over each said spoke and threaded into the mouth of said cylinder for retaining said spoke piston head in said cylinder,
 a compression spring disposed in each said cylinder and said bore urging said spoke radially outwardly,
 a transversely disposed member pivotally connected to the outer end of each said spoke,
 an axle extending through and fixed to each end of each of said transverse members, and
 a wheel rotatably mounted on the outer ends of each of said axles.
3. A resilient wheel comprising,
 a wheel hub having a plurality of radially extending cylinders formed in the periphery thereof,
 a spoke having one end thereof slidably disposed in each of said cylinders,
 means for retaining said spoke in said cylinder,
 spring means disposed in each said cylinder urging said spoke radially outwardly,
 a transversely disposed member connected to the outer end of each said spoke,
 an axle extending through and fixed to each end of each of said transverse members, and
 a wheel rotatably mounted on each outer end of each of said axles.
4. A resilient wheel comprising,
 a wheel hub having a plurality of radially extending openings formed in the periphery thereof,
 a spoke slidably disposed in each of said openings,
 spring means disposed in said openings urging said spoke radially outwardly, and
 transversely disposed bogie means having a plurality of wheels pivotally connected to the outer end of each said spoke.
5. In a wheel having hub means,
 bogie means carried by said hub means and comprising,
 transverse members pivotally connected to said hub means at substantially equally spaced points around the periphery thereof,
 an axle extending through and fixed to the outer ends of each of said transverse members, and
 wheels journaled on the outer ends of said axles.

(References on following page)

References Cited by the Examiner

UNITED STATES PATENTS

| | | | |
|---|---|---|---|
| 1,305,535 | 6/1919 | Grabowiecki | 301—5 |
| 1,309,540 | 7/1919 | Oldham | 152—14 |
| 1,326,679 | 12/1919 | Macbeth et al. | 301—5 |
| 1,660,845 | 2/1928 | Mamessier | 152—8 |
| 2,680,625 | 6/1954 | Richardson | 280—104.5 |
| 2,751,259 | 6/1956 | Bonmartini | 305—35 X |
| 3,019,061 | 1/1962 | Schomers. | |
| 3,058,754 | 10/1962 | Whitaker | 280—5.26 |

FOREIGN PATENTS 558,818    3/1957    Italy.

BENJAMIN HERSH, *Primary Examiner.*
ARTHUR L. LA POINT, *Examiner.*
R. J. JOHNSON, *Assistant Examiner.*